(12) United States Patent
Lu et al.

(10) Patent No.: US 7,451,522 B2
(45) Date of Patent: Nov. 18, 2008

(54) HINGE

(75) Inventors: Sheng-Nan Lu, Shulin (TW); Jia-Hao Hsu, Shulin (TW)

(73) Assignee: Shin Zu Shing Co., Ltd., Shulin, Taipei Hsien (TW)

( * ) Notice: Subject to any disclaimer, the term of this patent is extended or adjusted under 35 U.S.C. 154(b) by 437 days.

(21) Appl. No.: 11/391,273

(22) Filed: Mar. 29, 2006

(65) Prior Publication Data
US 2007/0033769 A1    Feb. 15, 2007

(30) Foreign Application Priority Data
Jul. 27, 2005    (TW) .............................. 94212762 U

(51) Int. Cl.
*E05D 11/08*    (2006.01)
(52) U.S. Cl. ........................................................ 16/342
(58) Field of Classification Search ................... 16/342, 16/337, 330, 303, 339; 248/917–923; 361/680–683; 348/373, 333.06; 455/575.1, 575.4, 575.8, 455/550.1, 90.3
See application file for complete search history.

(56) References Cited
U.S. PATENT DOCUMENTS
5,896,622 A * 4/1999 Lu ............................... 16/342

| | | | | |
|---|---|---|---|---|
| 5,950,281 A * | 9/1999 | Lu | ............................. | 16/342 |
| 6,230,365 B1 * | 5/2001 | Lu | ............................. | 16/342 |
| 6,657,856 B1 * | 12/2003 | Lu | ............................. | 361/683 |
| 6,871,383 B2 * | 3/2005 | Huang | ........................ | 16/295 |
| 7,124,473 B2 * | 10/2006 | Lu et al. | ........................ | 16/342 |
| 2006/0048337 A1 * | 3/2006 | Lowry et al. | .................. | 16/342 |
| 2006/0117530 A1 * | 6/2006 | Lu et al. | ....................... | 16/342 |
| 2007/0101543 A1 * | 5/2007 | Lu et al. | ....................... | 16/342 |
| 2007/0143963 A1 * | 6/2007 | Chern | ......................... | 16/342 |

FOREIGN PATENT DOCUMENTS

JP    2003254323 A  *  9/2003

* cited by examiner

*Primary Examiner*—Chuck Y. Mah
(74) *Attorney, Agent, or Firm*—Bacon & Thomas, PLLC

(57) ABSTRACT

A hinge has a positioning bracket, a rotating bracket, a pivotal pin, a washer, a mounting ring and two resilient sleeves. The positioning bracket has a sleeve. The sleeve has a through hole and an elongating groove. The rotating bracket has a connecting segment. The pivotal pin is attached to the rotating bracket and has a mounting shaft, a connecting shaft and a head. The washer and the mounting ring are mounted around the connecting shaft of the pivotal pin. The resilient sleeves are mounted around the connecting shaft, are mounted in the through hole of the sleeve and each resilient sleeve has a sleeve segment and a mounting slice. The sleeve segment has a through hole and a gap. The mounting slice is formed on the sleeve segment near the gap and is inserted into the elongating groove.

4 Claims, 6 Drawing Sheets

HINGE

BACKGROUND OF THE INVENTION

1. Field of the Invention

The present invention relates to a hinge, especially to a hinge mounted in an electrical appliance to allow a cover of the electrical appliance rotating relative to a base of the electrical appliance.

2. Description of the Related Art

Electrical appliances such as notebook computers comprise a cover, a base and a hinge. The hinge is usually mounted pivotally between the cover and the base to allow the cover rotating relative to the base. The conventional hinge comprises multiple resilient sleeves, a sleeve and a pivotal pin. Each resilient sleeve is elastic and is tubular and has an end, a gap, an extending segment and an inner diameter. The gap is formed in the end of the resilient sleeve. The extending segment extends radially from the resilient sleeve near the gap. The sleeve is hollow and is mounted around the resilient sleeves and is attached to the base of the electrical appliance. The pivotal pin extends through the resilient sleeves and is attached to the cover of the electrical appliance and has an outer diameter. The outer diameter of the pivotal pin is slightly large than the inner diameter of the resilient sleeve so the pivotal pin expands the resilient sleeves when the pivotal pin extends through the resilient sleeves. The friction between the resilient sleeves and the pivotal pin can position the pivotal pin in place. When the user rotates the cover relative to the base, the pivotal pin rotates relative to the sleeve and the resilient sleeves. Because the resilient sleeves are expanded by the pivotal pin to provide a clamping effect to the pivotal pin and hold the cover in place, to rotate the pivotal pin relative to the sleeve is difficult and laborious.

To overcome the shortcomings, the present invention provides a hinge that can reduce the shake between the resilient sleeves and the sleeve to mitigate or obviate the aforementioned problems.

SUMMARY OF THE INVENTION

The objective of the present invention is to provide a hinge that can reduce the shake between the reed pipes and the jacket, and make the cover can be rotated smoothly in relative to the base of the electrical appliance.

The hinge comprises a positioning bracket, a rotating bracket, a pivotal pin, a washer, a mounting ring and two resilient sleeves. The positioning bracket has a sleeve. The sleeve has a through hole and an elongating groove. The rotating bracket has a connecting segment. The pivotal pin is attached to the rotating bracket and has a mounting shaft, a connecting shaft and a head. The washer and the mounting ring are mounted around the connecting shaft of the pivotal pin. The resilient sleeves are mounted around the connecting shaft, are mounted in the through hole of the sleeve and each resilient sleeve has a sleeve segment and a mounting slice. The sleeve segment has a through hole and a gap. The mounting slice is formed on the sleeve segment near the gap and is inserted into the elongating groove.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
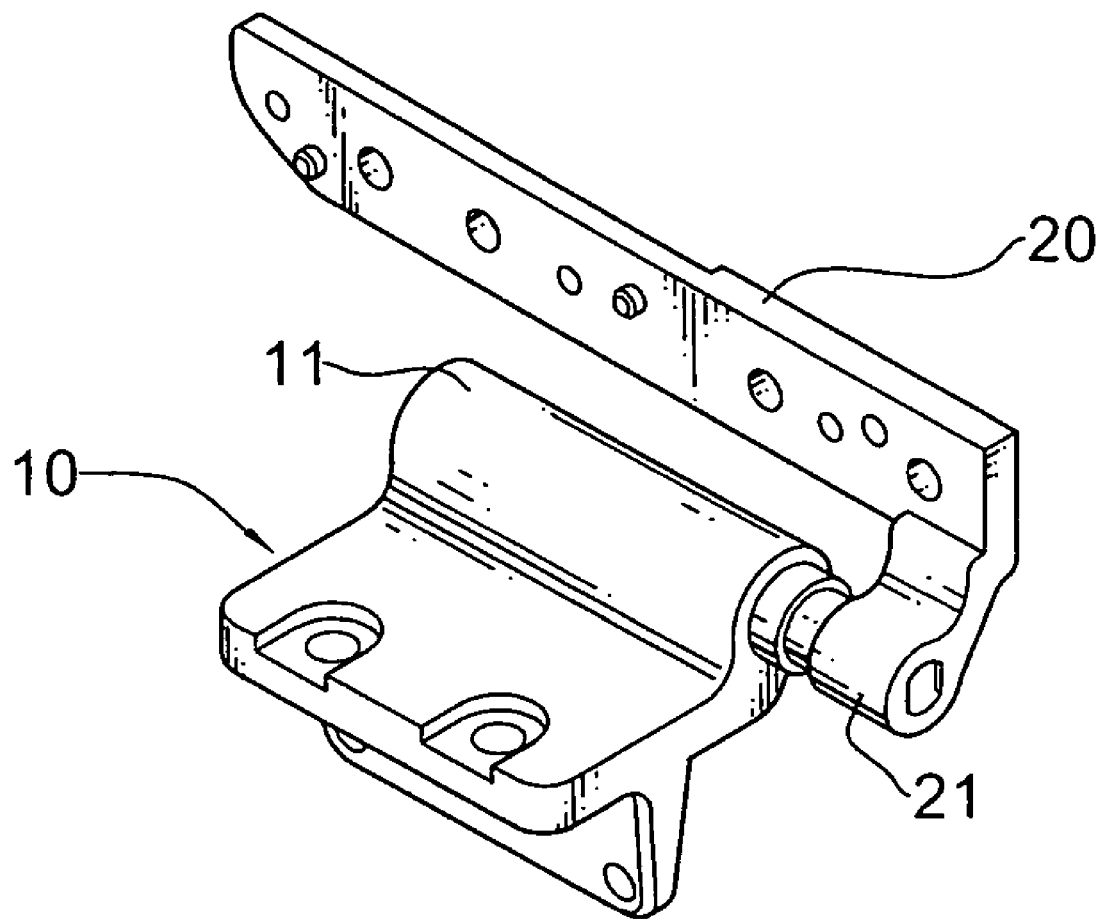
FIG. 1 is a perspective view of a hinge in accordance with the present invention.
Figure 2:
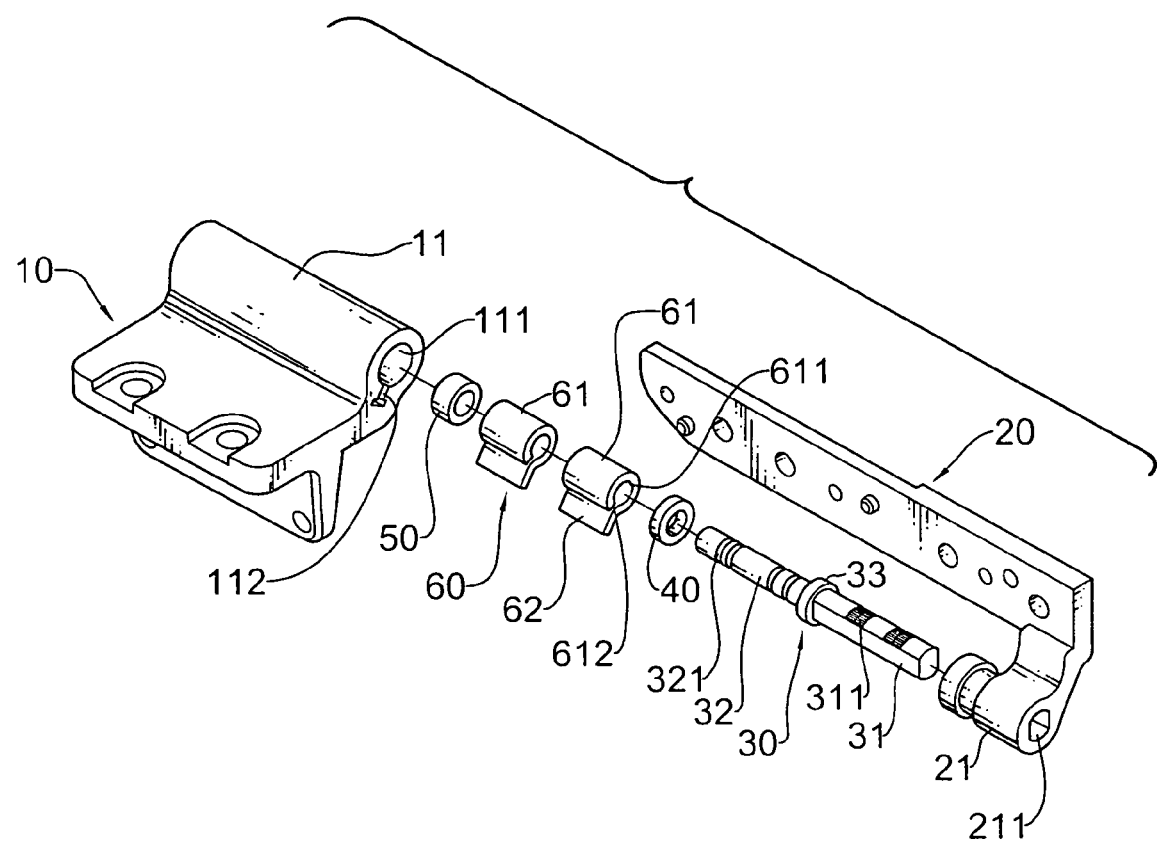
FIG. 2 is an explored perspective view of the hinge in FIG. 1.
Figure 3:
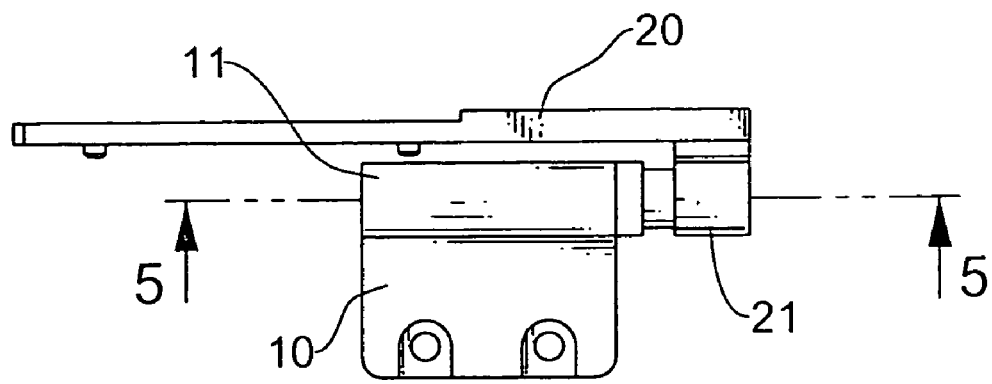
FIG. 3 is a top view of the hinge in FIG. 1.
Figure 4:
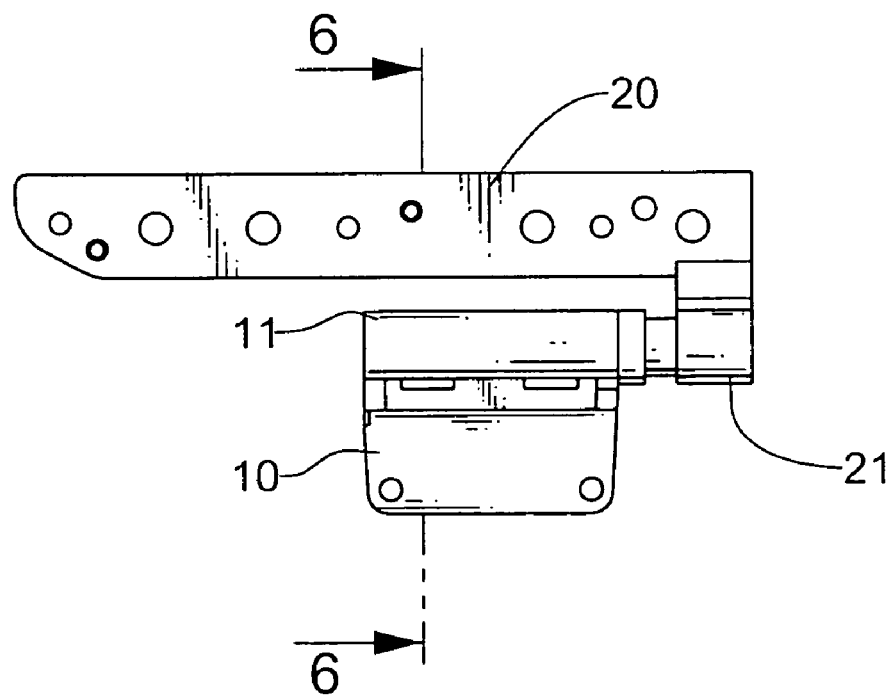
FIG. 4 is an operational top view of the hinge in FIG. 1.
Figure 5:
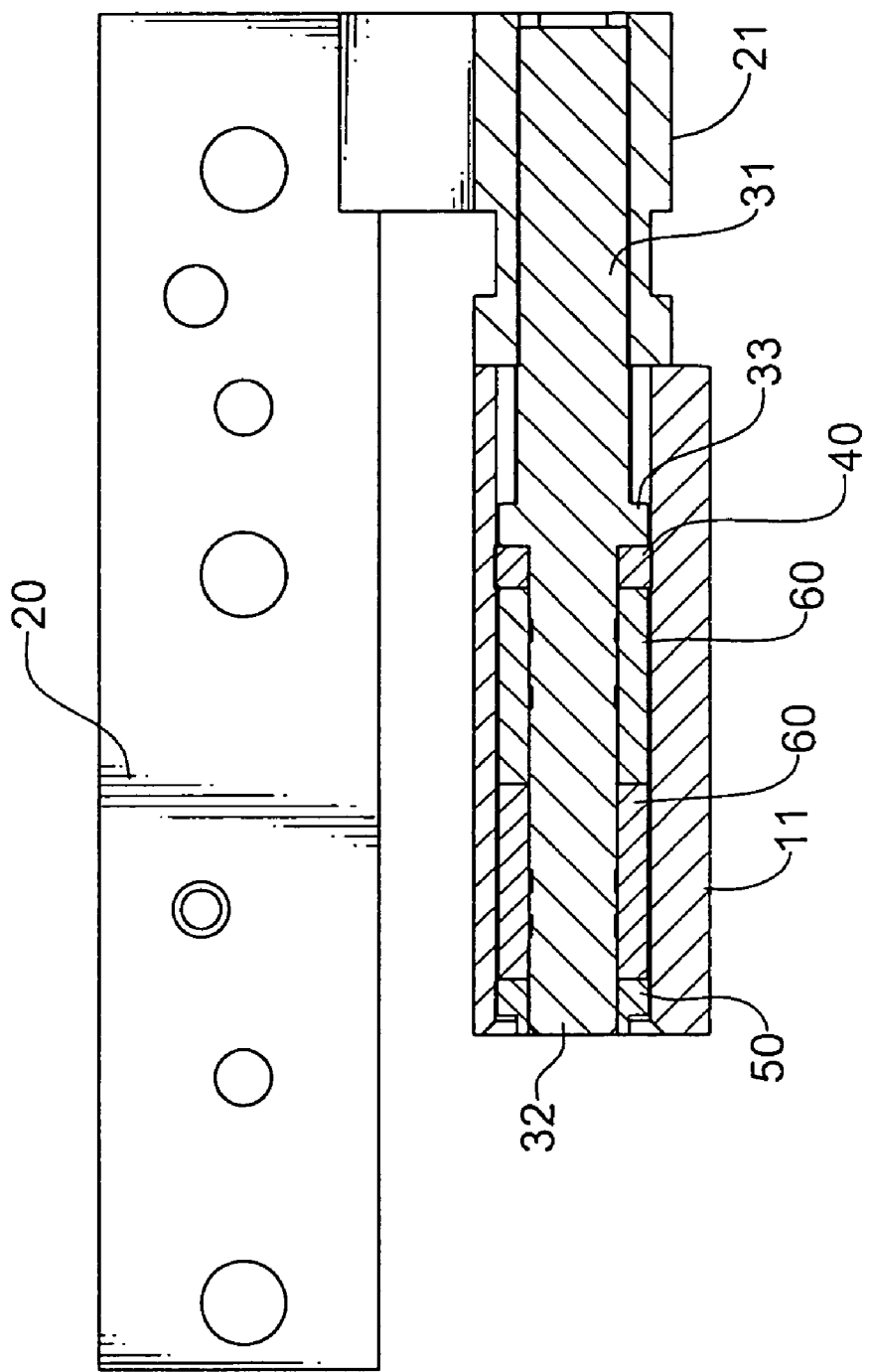
FIG. 5 is a cross sectional front view of the hinge along line 5-5 in FIG. 3.
Figure 6:
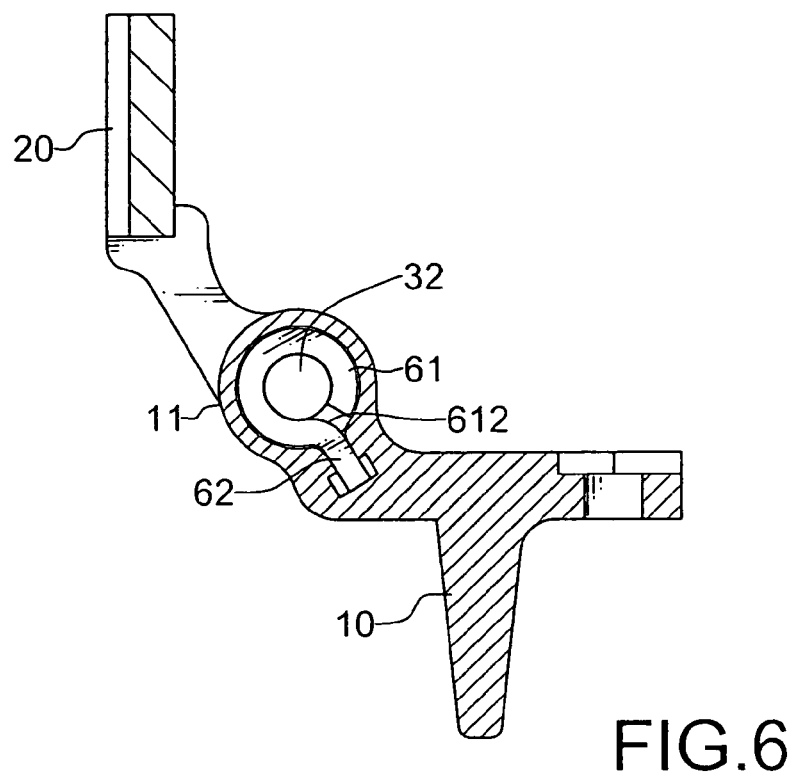
FIG. 6 is a side view in partial section of the hinge along line 6-6 in FIG. 4.
Figure 7:
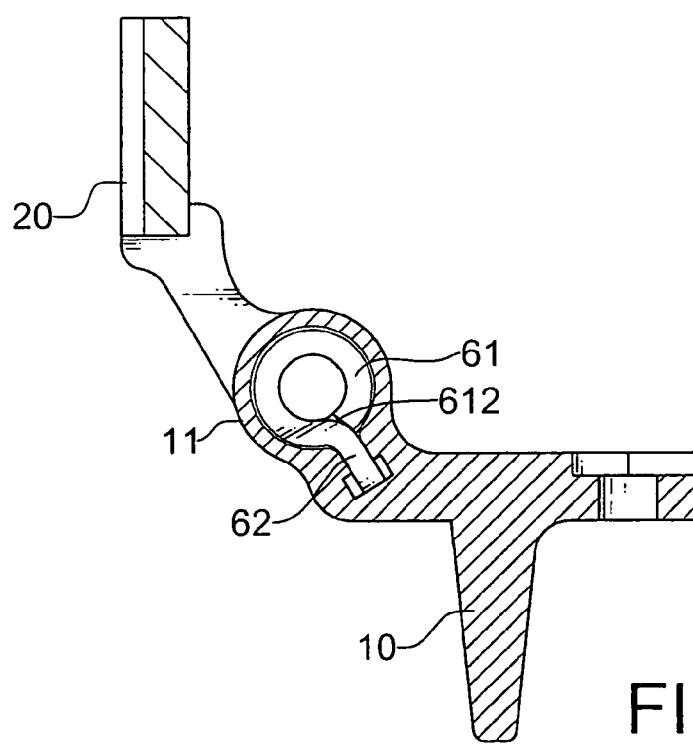
FIG. 7 is a side view in partial section of the hinge in FIG. 1.

With reference to FIGS. 1 to 7, a hinge in accordance with the present invention comprises a positioning bracket (10), a rotating bracket (20), a pivotal pin (30), a washer (40), a mounting ring (50) and two resilient sleeves (60).

The positioning bracket (10) has a side and a sleeve (11). The sleeve (11) is formed in the side of the positioning bracket (10) and has a through hole (111) and an elongating groove (112). The through hole (111) is formed axially through the sleeve (11). The elongating groove (112) is formed axially through the sleeve (11), communicates with the through hole (111) and can be I-shaped or T-shaped in cross section.

The rotating bracket (20) is a plate and has a proximal end, a distal end and a connecting segment (21). The connecting segment (21) protrudes out from the proximal end of the rotating bracket (20), comprises a mounting hole (211) and may have an inner wall and multiple indents. The mounting hole (211) is formed axially through the connecting segment (21) and is non-circular in cross section. The indents are formed in the inner wall of the connecting segment (21).

The pivotal pin (30) is attached to the rotating bracket (20) and has a proximal end, a distal end, a mounting shaft (31), a connecting shaft (32) and a head (33). The mounting shaft (31) is formed on the proximal end of the pivotal pin (30), extends into the mounting hole (211) of the connecting segment (21) on the rotating bracket (20), may be non-circular in cross section and may have an outer wall and multiple protruding veins (311). The protruding veins (311) are formed on the outer wall of the mounting shaft (31) and correspond to and engage the indents in the inner wall of the connecting segment (21). The connecting shaft (32) is formed on the distal end of the pivotal pin (30), extends into the through hole (111) of the sleeve (11) on the positioning bracket (10) and has an outer wall and multiple annular grooves (321). The annular grooves (321) are formed around the outer wall of the connecting shaft (32) and the user can drip lubricating oil over the annular grooves (321) to make the connecting shaft (32) rotate smoothly relative to the sleeve (11). The head (33) is formed on the pivotal pin (30) between the mounting shaft (31) and the connecting shaft (32) and is held inside the through hole (111) of the sleeve (11) on the positioning bracket (10).

The washer (40) is mounted around the connecting shaft (32) of the pivotal pin (30) between the annular grooves (321) and the head (33).

The mounting ring (50) is pressed upon and securely mounted around the connecting shaft (32) near the distal end of the pivotal pin (30).

The resilient sleeves (60) are mounted around and clamp the connecting shaft (32) of the pivotal pin (30), are mounted in the through hole (111) of the sleeve (11) on the positioning bracket (10). Each resilient sleeve (60) is elastic and has a sleeve segment (61) and a mounting slice (62). The washer (40) and the mounting ring (50) abut the resilient sleeves (60) separately to prevent the lubricating oil leaking from the resilient sleeves (60). The sleeve segment (61) is tubular and has a distal end, a through hole (611) and a slot (612). The through hole (611) is formed axially through the sleeve segment (61), is mounted around the connecting shaft (32). The slot (612) is longitudinally formed in the sleeve segment (61) and communicates with the through hole (611) to make the sleeve segment resilient. The mounting slice (62) is formed on the sleeve segment (61) adjacent to the slot (612) and is inserted into the elongating groove (112).

Figure 8:
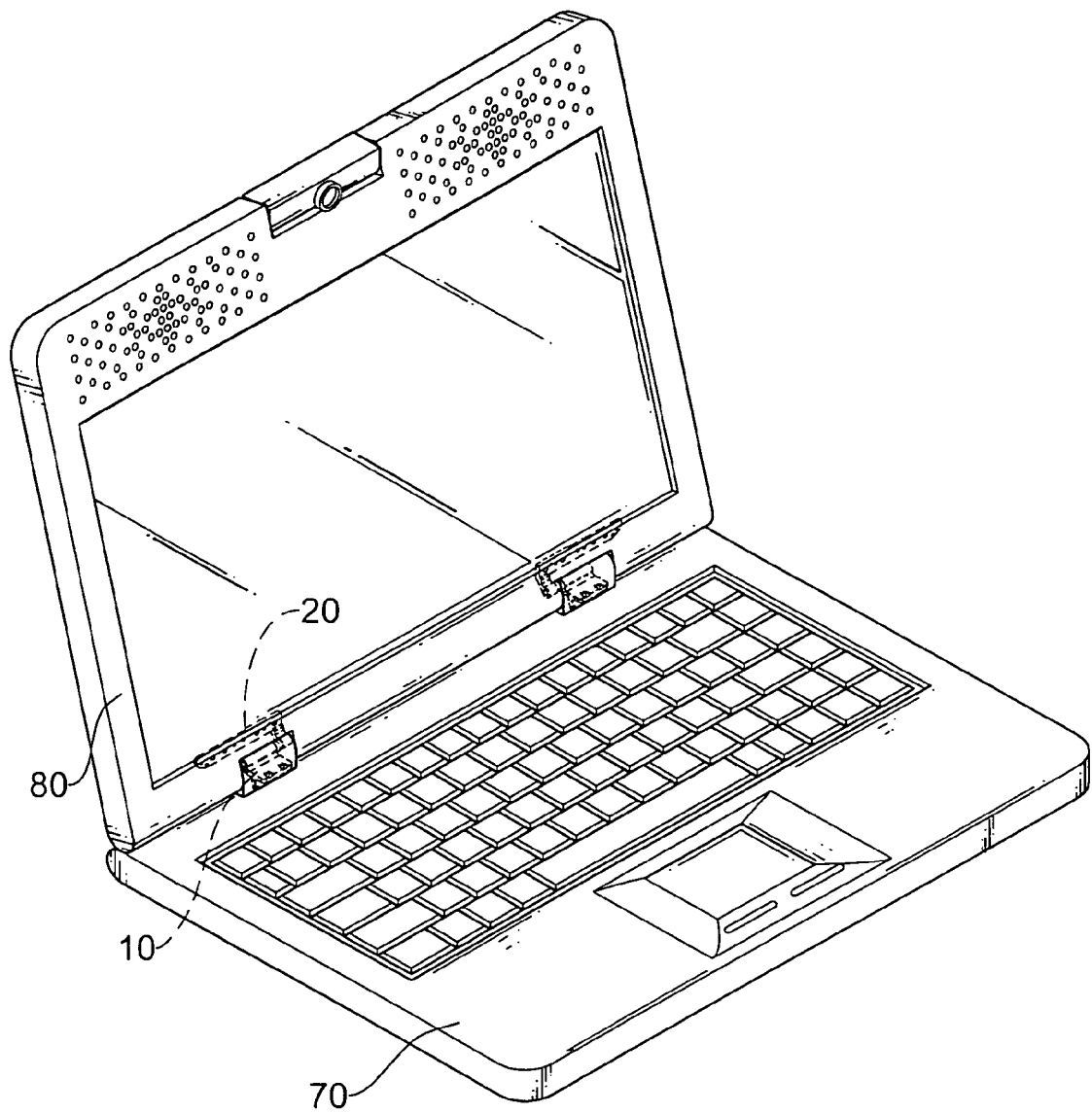
FIG. 8 is a perspective view of the hinge in FIG. 1 mounted in a notebook computer.

With further reference to FIG. 8, the hinge is mounted in an electrical appliance such as a notebook computer that has a base (70) and a cover (80). The positioning bracket (10) is attached to the base (70) of the electrical appliance. The rotating bracket (20) is attached to the cover (80) of the electrical appliance. When the cover (80) is pivoted relative to the base (70), the cover (80) rotates the rotating bracket (20). Then the rotating bracket (20) rotates the pivotal pin (30) relative to the sleeve (11) of the positioning bracket (10). The resilient sleeves (60) that resiliently clamp the connecting shaft (32) can hold the connecting shaft (32) in place, and the lubricant oil contained between the resilient sleeves (60) and the annular grooves (321) reduces the friction of rotating pivotal pin (30) relative to the resilient sleeves (60). Therefore, the cover (80) can be rotated smoothly and easily relative to the base (70) of the electrical appliance.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A hinge having
a positioning bracket having
a side; and
a sleeve formed in the side of the positioning bracket and having
a through hole formed axially through the sleeve; and
an elongating groove formed axially through the sleeve and communicating with the through hole;
a rotating bracket and having
a proximal end;
a distal end; and
a connecting segment protruding from the proximal end of the rotating bracket and having
a mounting hole formed axially through the connecting segment;
a pivotal pin attached to the rotating bracket and having
a proximal end;
a distal end;
a mounting shaft formed on the proximal end of the pivotal pin and extending into the mounting hole of the connecting segment on the rotating bracket;
a connecting shaft formed on the distal end of the pivotal pin, extending into the through hole of the sleeve on the positioning bracket and having
an outer wall; and
multiple annular grooves formed around the outer wall of the connecting shaft to contain lubricant oil inside; and
a head formed on the pivotal pin between the mounting shaft and the connecting shaft and extending into the through hole of the sleeve on the positioning bracket;
a washer mounted around the connecting shaft of the pivotal pin between the annular grooves and the head;
a mounting ring mounted securely around the connecting shaft near the distal end of the pivotal pin; and
two resilient sleeves mounted around and clamp the connecting shaft of the pivotal pin, mounted in the through hole of the sleeve on the positioning bracket, mounted between the washer and the mounting ring and each resilient sleeve having
a sleeve segment mounted around the connecting shaft and having
a distal end;
a through hole formed axially through the sleeve segment and mounted around the connecting shaft; and
a slot longitudinally formed in the sleeve segment and communicating with the through hole to make the sleeve segment resilient; and
a mounting slice formed on the sleeve segment, adjacent to the slot and inserted into the elongating groove.

2. The hinge as claimed in claim 1, wherein
the mounting shaft further has
an outer wall; and
multiple protruding veins formed on the outer wall of the mounting shaft.

3. The hinge as claimed in claim 2, wherein the elongating groove is T-shaped in cross section.

4. The hinge as claimed in claim 1, wherein the elongating groove is T-shaped in cross section.

* * * * *